No. 746,861. PATENTED DEC. 15, 1903.
H. H. MASTERSON & A. V. FRANKLIN.
CREAM SEPARATOR.
APPLICATION FILED OCT. 28, 1902.
NO MODEL. 2 SHEETS—SHEET 1.
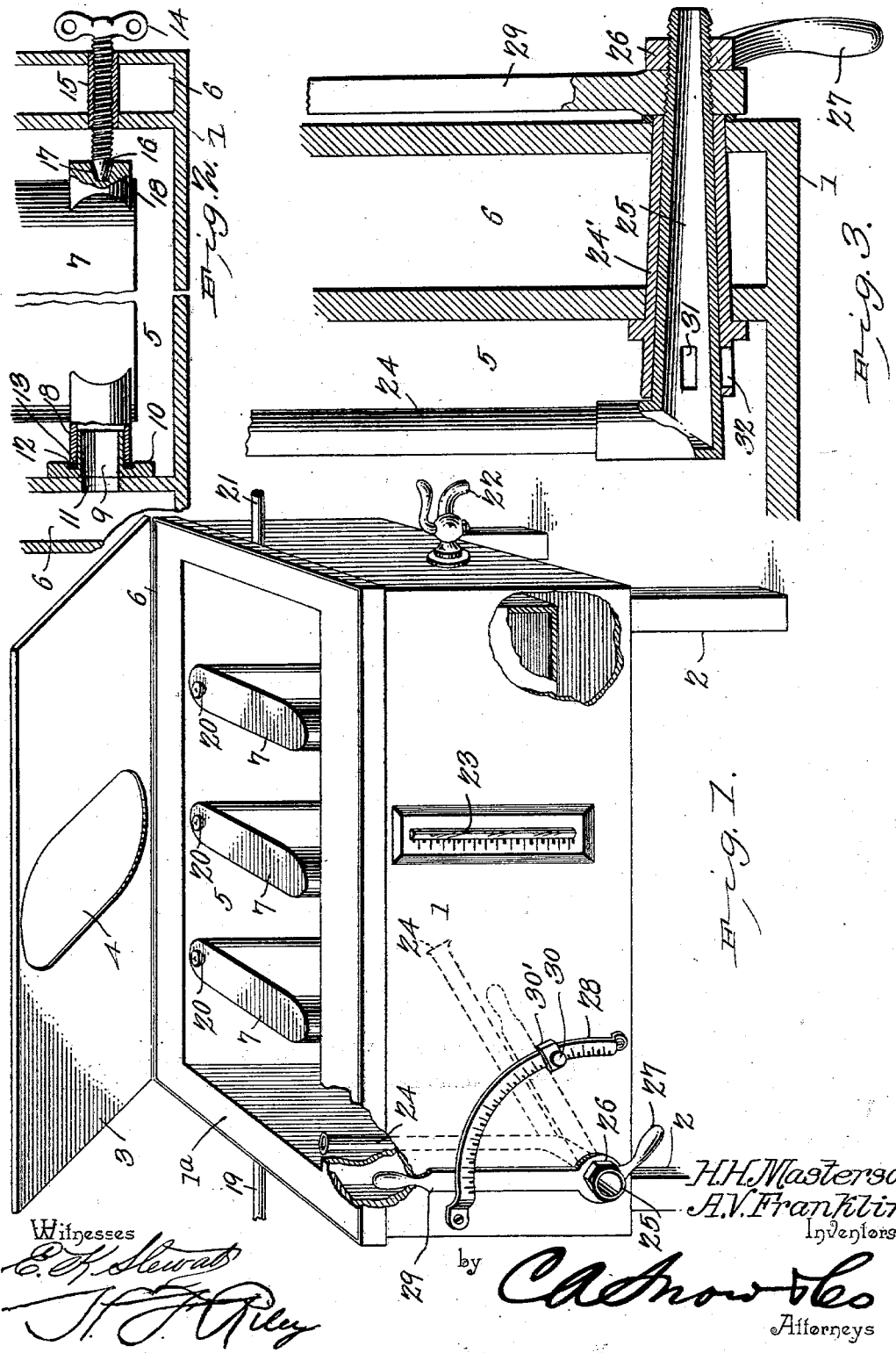

No. 746,861. PATENTED DEC. 15, 1903.
H. H. MASTERSON & A. V. FRANKLIN.
CREAM SEPARATOR.
APPLICATION FILED OCT. 28, 1902.
NO MODEL. 2 SHEETS—SHEET 2.
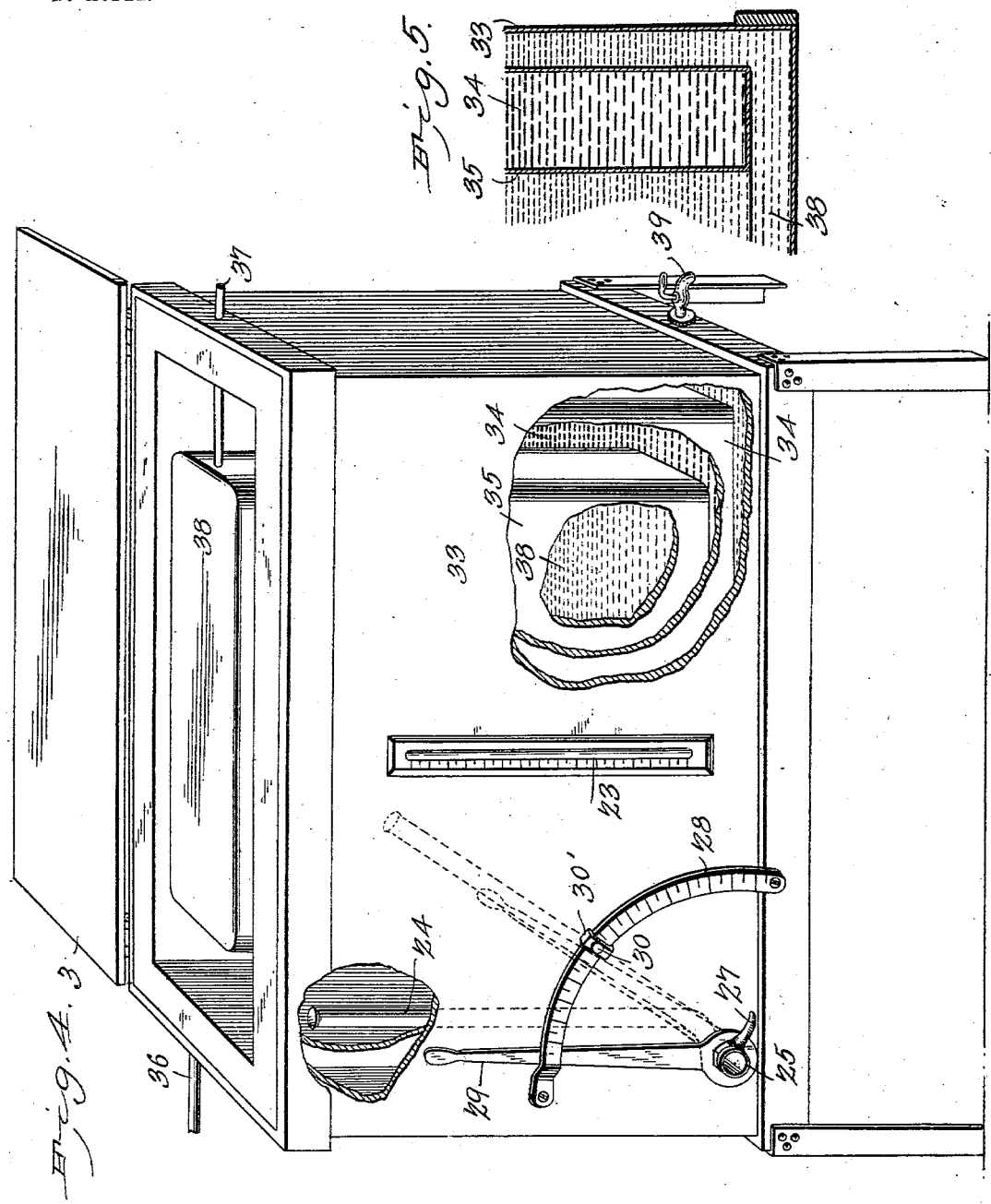

No. 746,861. Patented December 15, 1903.

UNITED STATES PATENT OFFICE.

HARRY H. MASTERSON AND ANTHONY V. FRANKLIN, OF ARKANSAS CITY, KANSAS.

CREAM-SEPARATOR.

SPECIFICATION forming part of Letters Patent No. 746,861, dated December 15, 1903.

Application filed October 28, 1902. Serial No. 129,164. (No model.)

*To all whom it may concern:*

Be it known that we, HARRY H. MASTERSON and ANTHONY V. FRANKLIN, citizens of the United States, residing at Arkansas City, in the county of Cowley and State of Kansas, have invented a new and useful Cream-Separator, of which the following is a specification.

The invention relates to improvements in cream-separators.

The object of the present invention is to improve the construction of cream-separators and to provide a simple, inexpensive, and efficient one adapted to effect a separation of cream from milk by reducing the temperature and by maintaining such reduced temperature until the removal of the cream and milk.

A further object of the invention is to provide a cream-separator of that character adapted to indicate the quantity of cream contained within it and capable of enabling the same to be accurately drawn off prior to removing the milk.

The invention consists in the construction and novel combination and arrangement of parts hereinafter fully described, illustrated in the accompanying drawings, and pointed out in the claims hereto appended.

In the drawings, Figure 1 is a perspective view of a cream-separator constructed in accordance with this invention. Fig. 2 is a transverse sectional view. Fig. 3 is an enlarged detail sectional view illustrating the manner of mounting the adjustable discharge-tube. Fig. 4 is a perspective view of a cream-separator, illustrating the simpler form of the invention. Fig. 5 is a detail sectional view illustrating the manner of mounting the inner water-receptacle.

Like numerals of reference designate corresponding parts in all the figures of the drawings.

1 designates an outer water-receptacle forming a casing and preferably supported by legs 2, which may be applied to the outer casing or receptacle in any suitable manner, as will be readily understood, and the said outer casing or receptacle is also provided with a hinged lid or cover 3, having a central opening 4 for a purpose hereinafter described.

Within the outer water-receptacle, which is preferably of cubical form, is arranged a cubical milk-receptacle 5, having its walls separated from the walls of the outer receptacle by an intervening space 6, forming an outer water-compartment for enabling the milk-receptacle to be surrounded by water. The intervening water-space formed by the outer water-receptacle and the milk-receptacle is closed at the top, and these top walls $1^a$, which are constructed of sheet metal or other suitable material, prevent any of the water from the said intervening space from flowing over into the milk-receptacle, and a circulation of water through the cream-separator may be maintained under pressure, if desired. The inner milk-receptacle, which is preferably constructed of sheet metal or other suitable material, has arranged within it a series of inner water-receptacles 7, constructed of sheet metal and communicating with the outer water-receptacle by the means hereinafter described. The inner water-receptacles (shown in Fig. 1 of the drawings) are employed for the purpose of providing a large area of cooling-surface for acting upon the contents of the milk-receptacle; but instead of employing a plurality of inner water-receptacles a single inner water-receptacle may be used.

In order to facilitate cleaning the inner water-receptacles after the cream-separator has been used, the said inner water-receptacles are hingedly or pivotally mounted, being provided at one side with a hollow journal 8, which also forms a coupling for connecting the inner water-receptacles with the outer water-receptacle. The hollow journal 8 fits over a short tube or nipple 9, which may be formed integral with a bearing-plate 10 and which registers with an opening 11 of the adjacent wall of the inner milk-receptacle, whereby communication is established between the inner water-receptacle and the outer water space or compartment 6, which surrounds the milk-receptacle. The bearing-plate 10 is provided adjacent to the inner end of the tube or nipple 9 with an annular groove 12, forming a seat for a packing 13, against which the tubular journal is held by means of an adjusting-screw 14, mounted at the opposite side of the milk-receptacle, preferably in a threaded tube 15, and having a tapered or conical inner end 16 for engaging a bearing recess or socket 17 of the water-receptacle 7. The threaded tube 15 preferably extends through the adjacent walls of the milk-receptacle 5, and the outer receptacle and the screw 14, which is provided at its outer end with a head or wings, are capable of being readily adjusted to hold the hollow journal tightly against the packing to form a water-tight joint. The socket 17 is preferably formed in a lug or projection 18, suitably secured to the inner water-receptacle and arranged as clearly shown in Fig. 2 of the drawings. The water-receptacles 7 are adapted to be oscillated in either direction to facilitate cleaning them and also to enable them to be submerged to the desired extent when the milk-receptacle is not completely filled.

The outer receptacle is provided at one end near the top with an inlet-pipe 19, by means of which the cream-separator is supplied with cool water, which first enters the outer receptacle and then flows through the hollow journals into the inner water-receptacles, which are provided at their upper ends with openings 20, adapted to form vents to permit the escape of air. The openings 20 are also provided with threaded caps for enabling the same to be closed when desired. The outer receptacle is also provided with an outlet-pipe 21, located at the end opposite that at which the inlet-pipe 19 is located, and it will be clear that as the cool water enters the cream-separator at one end thereof the warm water, which rises to the top, will escape through the outlet-pipe 21. The outer receptacle is also provided with a faucet or spigot 22 for enabling the contents of the outer water-chamber to be readily drawn off.

A suitable gage 23 is provided for enabling the height of the contents of the receptacle 5 and the quantity of cream contained therein to be readily ascertained. The gage preferably consists of a glass mounted within a suitable frame and arranged at the front of the separator, as indicated in Fig. 1; but any form of gage may be provided for this purpose.

The inner water-receptacles, which are preferably elliptical in horizontal section, are spaced from the front wall of the milk-receptacle to provide a space or opening for an oscillatory pivotally-mounted discharge pipe or tube 24, having an open upper end and designed to be arranged at different inclinations to locate the upper end or mouth of it at the desired elevation to enable the cream to be drawn off prior to removing the milk. The discharge pipe or tube is provided at its lower end with a tapering arm 25, extending outward through the front walls of the receptacles 1 and 5 and arranged within a tapering sleeve or socket 24', as clearly illustrated in Fig. 2 of the accompanying drawings. The lower arm 25, which is arranged approximately at right angles to the body portion of the discharge-tube, may be constructed separate from the same, as shown, or it may form a part thereof. The arm extends outward beyond the front wall of the receptacle 1 and is threaded to receive a nut 26, which secures a lever or arm 27 to the same and which is adapted to hold the tapered arm tightly within the tapering sleeve or socket 24' to form a water-tight or fluid-tight pivotal connection. The nut 26 is preferably provided with a handle 27 for enabling it to be readily rotated; but it may be constructed in any other desired manner. The gage 23 is provided with a vertical series of graduations, and the handle or lever 29 operates within a guide or keeper 28 provided with a curved series of graduations corresponding to those of the gage and adapted to permit the arm or lever to be readily arranged at a point corresponding with the lower cream-line within the milk-receptacle. The guide or keeper, which is curved, has slidably mounted on it a block 30', slotted to receive the guide or keeper and provided with a set-screw 30 for securing it at the desired adjustment. In practice when the cream-line is ascertained by inspecting the gage 23 the adjustable stop formed by the block 30' is set on the guide at a point corresponding with the said milk-line, and the lever or arm 29 is then swung downward against the stop, which limits the movement of the discharge pipe or tube. The cream is thus permitted to flow through the discharge pipe or tube to the exterior of the separator, and it is thereby removed prior to removing the milk. After the cream has been drawn off the discharge pipe or tube is swung downward to a horizontal position to permit the entire contents of the receptacle 5 to be drawn off, and in order to facilitate a complete emptying of the receptacle 5 the arm 25 of the discharge pipe or tube is provided with a slot 31, located at one side of the arm or tube when the body portion of the discharge pipe or tube is arranged in a perpendicular position and adapted, when the said body portion is swung downward to a horizontal position, to be carried by such movement into register with a bottom slot 32 of the socket or sleeve. The slot 32 is arranged adjacent to the bottom of the receptacle 5, and the entire contents of the same may be drawn off through the discharge pipe or tube.

In Fig. 4 of the drawings is illustrated the simpler form of the invention, the outer water-receptacle 33 being constructed similar to that heretofore described and being supported by a suitable wooden frame; but it may be mounted in any other desired manner. The outer water-receptacle is approximately cubical, and its walls are connected at the top with an intermediate milk-receptacle 34 by walls or flanges 35. The intervening space formed by the outer water-receptacle and the intermediate milk-receptacle is adapted to receive water or any other cooling medium from the supply-pipe 36, arranged at one end of the cream-separator, and a discharge-pipe 37 is arranged at the other end of the casing and communicates with an inner water-receptacle 38 of approximately cubical or rectangular form and consists of vertical walls and a horizontal top wall. The vertical walls are mounted on the bottom of the intermediate milk-receptacle, and the bottom of the inner water-receptacle, which is open, communicates with the intervening space between the outer water-receptacle and the intermediate milk-receptacle, so that the water rises within the inner water-receptacle to the same height as the water within the intervening space between the outer water-receptacle and the intermediate milk-receptacle, thereby forming a complete circulation of the water or other cooling agent around and through the center of the milk chamber or receptacle and providing a great area of cooling-surface. As the intervening space between the outer water-receptacle and the inner milk-receptacle is closed at the top and the inner water-receptacle is also closed at the top, the circulation of the cooling agent through and around the milk-chamber may be maintained under pressure, if desired.

The cream-separator is provided with a gage and with a device for drawing the cream and milk separately similar to those heretofore described, and a suitable cock or faucet 39 is arranged at one end of the outer water-receptacle at the bottom thereof for enabling the water to be drawn off.

We desire it to be understood that various changes in the form, proportion, size, and the minor details of construction within the scope of the appended claims may be resorted to without departing from the spirit or sacrificing any of the advantages of this invention.

What we claim is—

1. In a device of the class described, the combination with an outer receptacle for containing a cooling agent, of a milk-receptacle situated within the same, and an oscillatory discharge-tube located within the milk-receptacle and adapted to have its upper end arranged at different elevations to permit the cream being drawn off independently of the milk, said discharge-tube extending through the outer receptacle.

2. A device of the class described comprising a milk-receptacle, means for cooling the same, a gage having graduations, an oscillatory discharge-tube located within the milk-receptacle and communicating with the exterior of the separator, an exteriorly-arranged arm or handle connected with the discharge-tube, and a graduated guide having an adjustable stop arranged to be engaged by the arm or handle, the graduations on the guide being equivalent to those on the gage, substantially as described.

3. A device of the class described comprising an outer water-receptacle, an inner milk-receptacle, a tapering-sleeve extending through the adjacent walls of the said receptacles and provided at the bottom with a slot communicating with the milk-receptacle and located at the bottom thereof, an oscillatory discharge pipe or tube located within the milk-receptacle and having an arm extending through the tapering sleeve and provided with a slot adapted to register with the slot of the sleeve when the discharge pipe or tube is swung downward, said arm being extended beyond the sleeve and threaded, a handle or arm arranged on the extended portion of the said arm, and a nut engaging the said threaded portion, substantially as and for the purpose described.

4. A device of the class described comprising an outer receptacle, an inner milk-receptacle, a series of pivotal inner water-receptacles, located within the milk-receptacle and having hollow journals communicating with the outer receptacle, and means for withdrawing the cream and milk, substantially as described.

5. A device of the class described comprising an outer water-receptacle, an inner milk-receptacle provided with a tube or nipple communicating with the outer receptacle and provided with a bearing-plate having a groove, a washer seated in the groove, a receptacle located within the milk-receptacle and having a hollow journal receiving the said nipple and engaging the packing, and an adjusting-screw located at the opposite side of the receptacles and forming a journal for the inner water-receptacle, substantially as described.

In testimony that we claim the foregoing as our own we have hereto affixed our signatures in the presence of two witnesses.

HARRY H. MASTERSON.
ANTHONY V. FRANKLIN.

Witnesses:
JAMES BENEDICT,
WILLIAM F. TWEEDY.